United States Patent [19]

Gardner

[11] 4,191,062
[45] Mar. 4, 1980

[54] CHAIN DRIVE AND AUTOMATIC CHAIN TENSIONING UNIT

[75] Inventor: Lawrence R. Gardner, Aurora, Ill.

[73] Assignee: Chicago Bridge & Iron Company, Oak Brook, Ill.

[21] Appl. No.: 901,718

[22] Filed: May 1, 1978

[51] Int. Cl.² ............................................. F16H 7/16
[52] U.S. Cl. ............................................. 74/242.11 R
[58] Field of Search ............ 74/242.8, 242.9, 242.1 R, 74/242.1 A, 242.1 TA, 242.1 FP, 242.11 R, 242.11 A, 242.11 B, 242.11 C, 242.11 E, 242.11 L

[56] References Cited

U.S. PATENT DOCUMENTS

| | | | |
|---|---|---|---|
| 1,575,655 | 3/1926 | Stinson | 74/242.1 A |
| 2,875,842 | 3/1959 | Morrell | 74/242.11 R |
| 2,897,683 | 8/1959 | Carver | 74/242.1 R |
| 3,060,760 | 10/1962 | Minnis | 74/242.11 E |
| 3,374,686 | 3/1968 | Brewer | 74/227 X |
| 3,575,058 | 4/1971 | Kraus | 74/242.11 R |
| 3,602,054 | 8/1971 | Jackson et al. | 74/242.11 R |
| 3,630,096 | 8/1971 | Brewer | 74/242.11 A |
| 3,926,063 | 12/1975 | Mayfield | 74/242.11 A |
| 3,941,006 | 3/1976 | Brodesser | 74/242.1 R |
| 4,034,821 | 7/1977 | Stoddard et al. | 74/242.11 B |
| 4,069,719 | 1/1978 | Cancilla | 74/242.11 B |

FOREIGN PATENT DOCUMENTS

319307  3/1920  Fed. Rep. of Germany ..... 74/242.1 R

*Primary Examiner*—C. J. Husar
*Assistant Examiner*—Conrad Berman
*Attorney, Agent, or Firm*—Merriam, Marshall & Bicknell

[57] ABSTRACT

An automatic drive chain tensioner having a pair of idler assemblies, with each idler assembly comprising an idler sprocket and an indexing sprocket on each side of, and concentrically connected to, the idler sprocket with each idler assembly being adapted to be positioned on the outside of a drive chain loop on a chain run between a drive and driven sprocket with the idler sprocket thereof adapted to be engaged in the drive chain and with the idler assemblies on different and opposite spaced-apart drive chain runs; and a pair of indexing chain loops, each one of which is adapted to engage an indexing sprocket on each of the spaced-apart idler assemblies on the same side of the drive chain. Desirably, the idler sprockets are the same size and, desirably, the indexing sprockets are the same size but not necessarily the same size as the idler sprockets.

6 Claims, 7 Drawing Figures

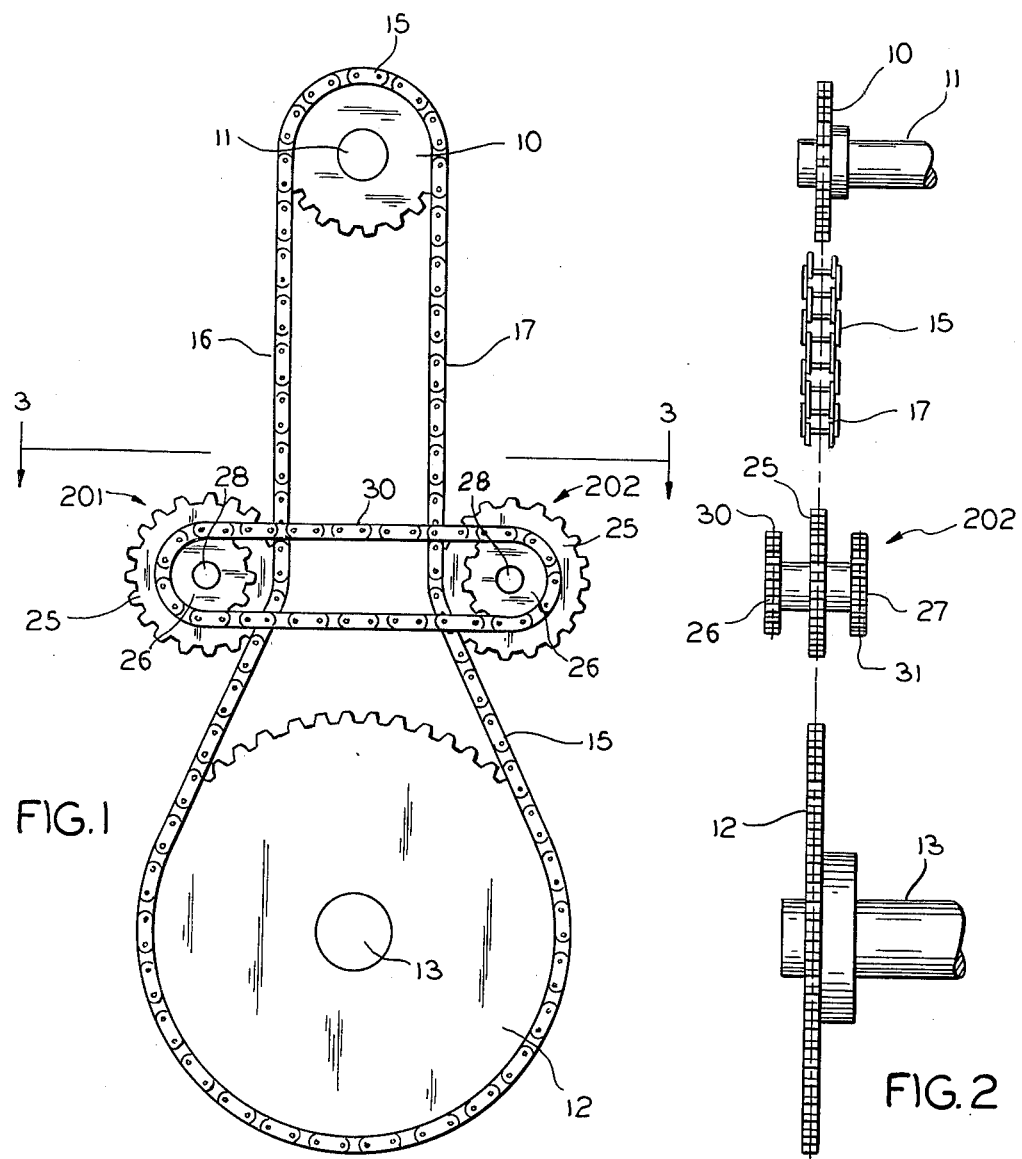
FIG.1
FIG.2
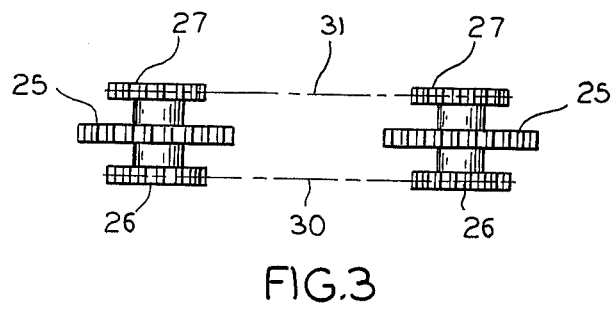
FIG.3

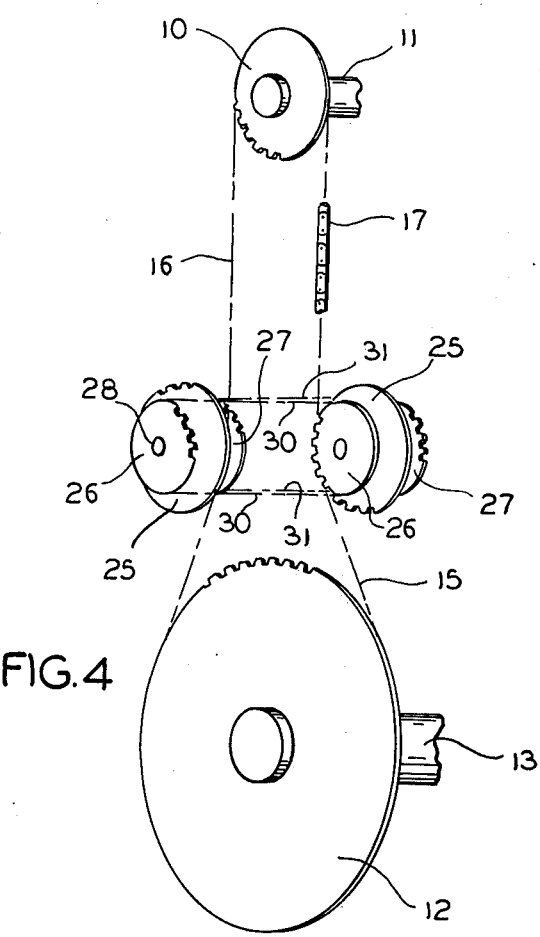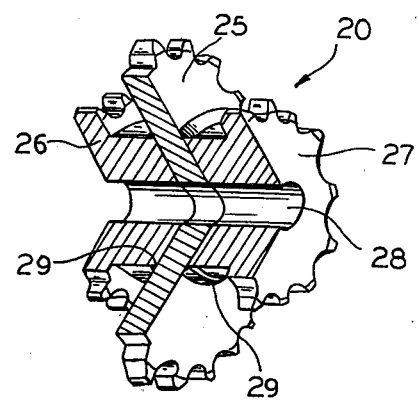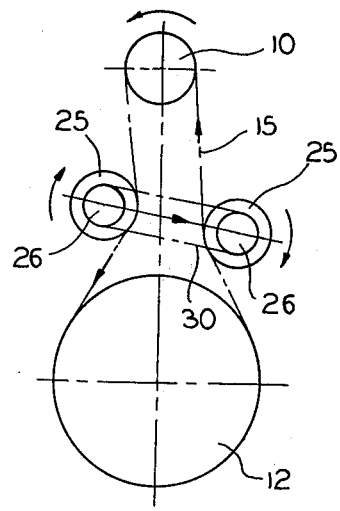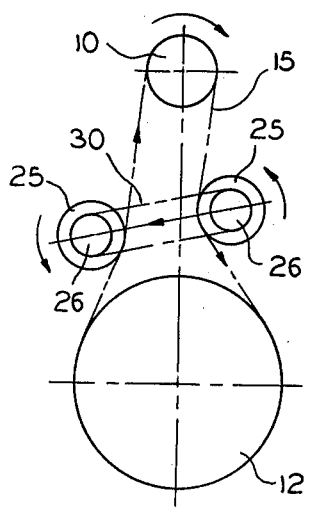
FIG.4
FIG.5
FIG.6
FIG.7

CHAIN DRIVE AND AUTOMATIC CHAIN TENSIONING UNIT

This invention relates to sprocket driven chain drives. More particularly, this invention is concerned with a novel automatic chain tensioner and the combination of a reversible sprocket driven chain drive with the automatic chain tensioner.

A simple chain drive assembly usually consists of a drive shaft, a drive sprocket which is keyed or otherwise attached to the drive shaft, a driven shaft, and a driven sprocket which is keyed or otherwise attached to the driven shaft, and a drive chain which is wrapped or looped around the drive sprocket and the driven sprocket to transmit power to the driven shaft. This configuration, while being of simple and efficient design, has its problems, some of which are elongation of the drive chain by wear, and by wear of the drive sprocket and driven sprocket. This results in a loosening of the drive chain which then tends to skip or ratchet over the drive sprocket or driven sprocket when the unit is under operating load. This creates a need for a drive chain take-up or tensioning unit to eliminate this common problem.

Several of the more common types of drive chain take-ups are the sliding shaft arrangements in which either the drive shaft and drive sprocket, or the driven shaft and driven sprocket, are slid in an effort to make drive chain adjustments. In cases where this method is impractical because of shaft alignment in the equipment involved, an external idler sprocket can be used. See U.S. Pat. No. 3,374,686. This idler sprocket is always located on the slack or loose side of the drive chain so no deflectional stresses are introduced to it or its supporting structure. If this idler sprocket were to be used in a reversing rotation drive, it would be difficult to construct a strong enough support to take the excessive stress imposed on the idler sprocket and shaft. Therefore, the idler sprocket's use should be limited to single directional drives only.

In recent years, a method has been developed to automatically maintain drive chain tension on reversible chain drive assemblies which are required to rotate in either clockwise or counterclockwise directions. It is marketed as the "X-Series Floating Mount" by the Brewer Machine and Gear Company, St. Louis, Missouri, and is disclosed in U.S. Pat. No. 3,630,096. This chain tensioning apparatus requires a firm mounting support and constant maintenance to insure proper adjustment and lubrication of the bearing surfaces. The tight side of the drive chain is in a straight line, with one of the idler sprockets riding on the outside bottom of the drive chain and the other idler sprocket on the outside top of the drive chain. The idler assembly is adjusted just tight enough to remove excessive drive chain slack. The drive chain side with the slack, of course, reverses with change in the direction of rotation. This configuration does not lend itself to automatic slack take-up, and as chain elongation and sprocket wear occur, the unit must be continuously adjusted manually to compensate for it. As chain elongation and sprocket wear cause the drive chain to become slack, the center distance between the two idlers must be manually adjusted to compensate for this normal and continuous wear. Also, it is not very suitable for handling large size drive chains required in some chain driven equipment.

According to one aspect of the subject invention, there is provided an automatic drive chain tensioner which comprises a pair of idler assemblies, with each idler assembly comprising an idler sprocket and an indexing sprocket on each side of, and concentrically connected to, the idler sprocket; with each idler assembly being adapted to be positioned on the outside of a drive chain loop on a chain run between a drive and driven sprocket with the idler sprocket thereof adapted to be engaged in the drive chain and with the idler assemblies on different and opposite spaced-apart drive chain runs; and a pair of indexing chain loops, each one of which is adapted to engage an indexing sprocket on each of the spaced-apart idler assemblies on the same side of the drive chain.

According to a further aspect of the invention, there is provided apparatus comprising a drive sprocket, a driven sprocket and a drive chain loop encircling and engaging the drive and driven sprockets; a pair of idler assemblies, with each idler assembly comprising an idler sprocket and an indexing sprocket on each side of, and concentrically connected to, the idler sprocket; a first idler assembly on the outside of the drive chain loop on a chain run between the drive and driven sprockets with the idler sprocket engaged in the drive chain; and the second idler assembly being on the outside of the drive chain loop on a chain run between the drive and driven sprockets with the idler sprocket engaged in the drive chain. The first and second idler assemblies are on different and opposite spaced-apart drive chain runs. A first indexing chain loop encircles and engages one of the indexing sprockets on the first idler sprocket and one of the indexing sprockets on the second idler sprocket. A second indexing chain loop encircles and engages the other indexing sprocket on the first idler sprocket and the other indexing sprocket on the second idler sprocket.

The first and second indexing chains are on opposite sides of the drive shaft. The idler sprockets are desirably made the same size. Also, the indexing sprockets desirably are all made the same size, but they can be the same size or larger or smaller than the idler sprockets. If, for some equipment clearance reason, the idler sprockets in the two idler assemblies are not made the same diameter, then it is necessary that the size of the indexing sprockets in the two idler assemblies vary in the same ratio of diameters as the ratio of the idler sprocket diameters. The two indexing sprockets on which one of the indexing chain loops runs can be the same size but they can be smaller, larger or the same size as the two indexing sprockets on which the other indexing chain loop runs. It is generally best, though, for all the indexing sprockets to be the same size so that the tensioning apparatus is balanced on the drive chain. The indexing chain pitch can vary from that of the main chain but usually is of a smaller or shorter pitch length. However, the pitch of the indexing chains could technically be of the same pitch or larger than the drive chain. At present, it appears that an indexing chain pitch of approximately ⅜ of that of the drive chain creates the smoothest operation. Also, the size comparison of the idler sprocket to the indexing sprockets, when based on pitch diameter, will generally be of equal or larger diameter. However, an indexing sprocket of approximately ⅝ the pitch diameter of the idler sprocket gives a smoother operation.

The chain tensioning or take-up unit of this invention is attached directly on the drive chain and thus avoids use of a mounting bracket.

The chain take-up or tensioning unit, while allowing for drive chain elongation and sprocket wear due to normal operation, eliminates the need for take-up adjustment during the drive chain's normal service life.

The tensioning unit will also maintain its general location on the drive chain after installation, thereby eliminating a need for external attachment structures. The only maintenance required is the same as the drive chain and should be carried out in normal maintenance procedure as dictated by the drive chain's location and use.

The chain tensioning unit can be used on chain drives which are reversible or nonreversible, vertical, horizontal or inclined.

The invention will be described further in conjunction with the attached drawings, in which:

FIG. 1 is a front elevational view of a chain drive with an automatic chain tensioner according to the invention mounted thereon;

FIG. 2 is a side elevational view of the apparatus of FIG. 1;

FIG. 3 is a view taken along the line 3—3 of FIG. 1;

FIG. 4 is an isometric view of the apparatus shown in FIGS. 1 to 3;

FIG. 5 is an isometric, partially sectional, view of an idler assembly;

FIG. 6 is a schematic view of the apparatus of FIGS. 1 to 4 showing the position which the automatic chain tensioner seeks when the drive sprocket rotates counterclockwise; and FIG. 7 is a schematic view of the apparatus of FIGS. 1 to 4 showing the position which the automatic chain tensioner seeks when the drive sprocket rotates clockwise.

So far as is practical the same elements or parts which appear in the various views of the drawings will be identified by the same numbers.

With reference to FIGS. 1 to 4, drive sprocket 10 is keyed or otherwise fixedly attached to drive shaft 11. Spaced away from the drive sprocket 10 is driven sprocket 12 keyed or otherwise fixedly attached to driven shaft 13. Drive chain 15 is wrapped or looped around the drive sprocket 10 and the driven sprocket 12 to transmit power to the drive shaft 13.

An idler sprocket assembly 20, as shown in FIG. 5, is placed on each outside surface of both sides of the drive chain 15. Thus, one such idler sprocket assembly 201 is placed on drive chain run 16 and another such assembly 202 is placed on drive chain run 17.

The idler assemblies 20, 201 and 202 are identical. As shown in FIG. 5, idler assembly 20, and thus idler assemblies 201 and 202 as well, consist of a central idler sprocket 25 and two indexing sprockets 26 and 27. The sprocket 25, 26 and 27 are rigidly joined together in a concentric manner so as to rotate as a single unit. Although the idler assembly 20 shown in FIG. 5 has an axle or shaft hole 28 there is no need for such a hole. The hole 28, however, does serve as an alignment guide if the idler assembly is fabricated out of three sprockets 25, 26 and 27 which are welded together at 29 with a shaft temporarily located in hole 28. The angular location of the idler sprocket 25 teeth to the teeth of the indexing sprockets 26 and 27 is not important. The indexing sprockets 26 and 27 are desirably accurately aligned in assembly 20 so that the identical indexing chains 30 and 31 which control the location and rotation of the idler assemblies will work together and equally share the load of the automatic chain tensioning unit.

It is generally desirable to put in extra drive chain links so that the idler assemblies 201 and 202 can be placed over the drive chain 15 and the drive chain runs 16 and 17 thereby brought closer together. In this way the idler sprocket assemblies can locate themselves along the free length (runs 16 and 17) of the drive chain 15.

The idler sprocket 25 of idler assembly 201 is engaged on the outside of drive chain run 16 and idler sprocket 25 of idler assembly 202 is engaged on the outside of drive chain run 17. The idler sprocket assemblies 201 and 202 should be located nearer to the driven sprocket 12 than to the drive sprocket 10. When the proper location of the idler sprocket assemblies 201 and 202 have been obtained, the idler sprocket 25 of each idler sprocket assembly should be well engaged with the drive chain 15 and this chain should be equally deflected inward at both sides at this point of engagement and in a neutral condition. The center-to-center distance of the idler assemblies is predetermined to automatically compensate for elongation of drive chain and sprocket wear without allowing the tight side of the drive chain to attain a completely straight line.

The indexing chains 30 and 31 are then assembled respectively to the indexing sprockets 26 and 27 which are located one on each side of each idler sprocket 25 on the idler sprocket assembly. These indexing chains 30 and 31 now straddle the drive chain 15 and after the indexing chain connecting links are secured, the automatic chain tensioner unit assembly is complete.

When torque is introduced into the drive chain assembly via the drive sprocket 10, the working or tight side of the drive chain will attempt to straighten itself out. Due to the close center-to-center distance of the idler sprocket assemblies, which is controlled and maintained by the indexing chains 30 and 31, the tight side of the drive chain cannot attain a straight line. As the taut side of the drive chain 15 attempts to gain a straight line, it draws the automatic chain tensioner unit with it, which in turn moves the slack side of the drive chain into a counter-acting force to the working or tight side of the drive chain. It is due to this geometry that the drive chain cannot at any time in its working cycle, whether in clockwise (FIG. 7) or counterclockwise (FIG. 6) rotation, or changing rotation, lose its tension, due to the counteracting force applied to the drive chain assembly via the automatic chain tensioning unit. As shown in FIGS. 6 and 7, the automatic chain tensioning unit attempts to move into a position which automatically seeks a point of least chain stress. When this occurs, the working position of the chain has been reached. Upon reversing the direction of rotation, the unit returns to center and relocates itself on the drive chain in its best operative condition for this reversed rotation. The unit rocks on the drive chain, but due to the indexing chains, it cannot climb or fall from its nominal installed location and thus requires no external restraints or supports.

As drive chain 15, drive sprocket 10 and driven sprocket 12 wear and elongate, the tight or working side of the drive chain will become closer to attaining a straighter line under working conditions. No manual adjustment will have to be made after the installation of the automatic chain tensioner unit. Also, the only maintenance required of the unit is that which is required of the drive chain in normal maintenance patterns which would be dictated by the location of the installation and climatic conditions in which the equipment is installed.

The foregoing detailed description is given for clearness of understanding only and no unnecessary limitations should be understood therefrom, as modifications will be obvious to those skilled in the art.

What is claimed is:

1. An automatic drive chain tensioner, which comprises:
    a pair of idler assemblies, with each idler assembly comprising an idler sprocket and an indexing sprocket on each side of, and concentrically connected to, the idler sprocket with each idler assembly being adapted to be positioned on the outside of a drive chain loop on a chain run between a drive and driven sprocket with the idler sprocket thereof adapted to be engaged in the drive chain and with the idler assemblies on different and opposite spaced-apart drive chain runs; and
    a pair of indexing chain loops, each one of which is adapted to engage an indexing sprocket on each of the spaced-apart idler assemblies on the same side of the drive chain.

2. Apparatus according to claim 1 in which the idler sprockets are the same size.

3. Apparatus according to claim 2 in which the indexing sprockets are the same size.

4. Apparatus comprising:
    a drive sprocket, a driven sprocket and a drive chain loop encircling and engaging the drive and driven sprockets;
    a pair of idler assemblies, with each idler assembly comprising an idler sprocket and an indexing sprocket on each side of, and concentrically connected to, the idler sprocket;
    a first idler assembly being on the outside of the drive chain loop on a chain run between the drive and driven sprockets with the idler sprocket engaged in the drive chain;
    the second idler assembly being on the outside of the drive chain loop on a chain run between the drive and driven sprockets with the idler sprocket engaged in the drive chain;
    the first and second idler assemblies being on different and opposite spaced-apart drive chain runs;
    a first indexing chain loop encircling and engaging one of the indexing sprockets on the first idler sprocket and one of the indexing sprockets on the second idler sprocket; and
    a second indexing chain loop encircling and engaging the other indexing sprocket on the first idler sprocket and the other indexing sprocket on the second idler sprocket.

5. Apparatus according to claim 4 in which the idler sprockets are the same size.

6. Apparatus according to claim 5 in which the indexing sprockets are the same size.

* * * * *